US010613728B2

(12) United States Patent
Dharmalingam et al.

(10) Patent No.: US 10,613,728 B2
(45) Date of Patent: *Apr. 7, 2020

(54) SYSTEM AND METHOD FOR VIRTUAL REGION BASED ACCESS CONTROL OPERATIONS USING BIM

(71) Applicant: Honeywell International Inc., Morristown, NJ (US)

(72) Inventors: Vinoth Dharmalingam, Erode (IN); Viswanathan Chatapuram Krishnan, Madurai (IN); Vinay Venkatesh, Bangalore (IN); Paul M. Popowski, Lake Mills, WI (US)

(73) Assignee: Honeywell International Inc., Morris Plains, NJ (US)

( * ) Notice: Subject to any disclaimer, the term of this patent is extended or adjusted under 35 U.S.C. 154(b) by 575 days.

This patent is subject to a terminal disclaimer.

(21) Appl. No.: 15/139,905

(22) Filed: Apr. 27, 2016

(65) Prior Publication Data
US 2016/0239199 A1    Aug. 18, 2016

Related U.S. Application Data

(63) Continuation of application No. 13/968,494, filed on Aug. 16, 2013, now Pat. No. 9,342,223.

(51) Int. Cl.
*G06F 3/0484* (2013.01)
*G08B 25/14* (2006.01)
(Continued)

(52) U.S. Cl.
CPC ...... *G06F 3/04847* (2013.01); *G06F 3/04815* (2013.01); *G06F 3/04842* (2013.01);
(Continued)

(58) Field of Classification Search
CPC ............ G05B 2219/2642; G05B 15/02; G05B 19/32085; G08B 25/008; G08B 25/14;
(Continued)

(56) References Cited

U.S. PATENT DOCUMENTS 5,086,385 A   2/1992  Launey et al.
7,443,298 B2  10/2008 Cole et al.
(Continued)

OTHER PUBLICATIONS

Extended European Search Report, dated Jan. 23, 2015, corresponding to EP Application No. 14179942.9.

*Primary Examiner* — Andrew L Tank
(74) *Attorney, Agent, or Firm* — Seager Tufte & Wickhem LLP

(57) ABSTRACT

Systems and methods for operating a security system are provided that can include a user interface device displaying a three-dimensional model of a secured area based on a BIM, the user interface device displaying a representation of each of a plurality of security devices in the secured area on the model based on respective coordinates of each of the plurality of security devices in the BIM, the user interface device receiving first user input dividing the model into a plurality of subareas, the user input device receiving second user input identifying a change in at least one operating parameter for at least one of the plurality of subareas, and applying the change in the at least one operating parameter to security devices that are represented on the three-dimensional model of the secured area within the at least one of the plurality of subareas.

18 Claims, 4 Drawing Sheets

(51) Int. Cl.
 *G06F 3/0481* (2013.01)
 *G08B 13/196* (2006.01)

(52) U.S. Cl.
 CPC ... *G08B 13/1968* (2013.01); *G08B 13/19682* (2013.01); *G08B 25/14* (2013.01)

(58) Field of Classification Search
 CPC .......... G08B 13/1968; G08B 13/19682; G06F 3/04847; G06F 3/04842; G06F 3/04815; H04L 41/24
 See application file for complete search history.

(56) References Cited

U.S. PATENT DOCUMENTS

| | | |
|---|---|---|
| 8,427,297 B1 | 4/2013 | Markey et al. |
| 8,533,612 B2 | 9/2013 | Hochendoner et al. |
| 2005/0090915 A1 | 4/2005 | Geiwitz |
| 2005/0119767 A1* | 6/2005 | Kiwimagi ............ G05B 19/042 700/19 |
| 2006/0010388 A1* | 1/2006 | Imhof .................... G05B 15/02 715/734 |
| 2007/0219645 A1 | 9/2007 | Thomas et al. |
| 2009/0307255 A1 | 12/2009 | Park |
| 2010/0187832 A1 | 7/2010 | Holland et al. |
| 2010/0318911 A1* | 12/2010 | Holladay ......... H04N 21/43615 715/716 |
| 2011/0077754 A1 | 3/2011 | Jones et al. |
| 2011/0133884 A1 | 6/2011 | Kumar et al. |
| 2012/0066608 A1 | 3/2012 | Sundermeyer et al. |
| 2012/0133482 A1 | 5/2012 | Bhandari et al. |
| 2012/0143356 A1* | 6/2012 | Berg-Sonne ........... G05B 15/02 700/49 |
| 2013/0212130 A1 | 8/2013 | Rahnama |
| 2013/0257858 A1* | 10/2013 | Na .......................... A63F 13/10 345/419 |
| 2013/0282180 A1 | 10/2013 | Layton |
| 2014/0266669 A1 | 9/2014 | Fadell et al. |

* cited by examiner

Time zone modification using proposed solution

Copy/Paste rules and behavior settings using proposed solution

SYSTEM AND METHOD FOR VIRTUAL REGION BASED ACCESS CONTROL OPERATIONS USING BIM

CROSS-REFERENCE TO RELATED APPLICATIONS

This application is a continuation of and claims the benefit of the filing date of U.S. application Ser. No. 13/968,494 filed Aug. 16, 2013.

FIELD

The field of the invention relates to security systems and more particularly to methods of administering to the operations of such systems.

BACKGROUND

Security systems are generally known. Such systems are typically used for the protection of people and assets within a secured area.

In many cases, the secured area is surrounded by some sort of physical barrier (e.g., a fence, wall, etc.) with one or more access doors for entry and egress of authorized users. A sensor may be provided on each door and window in order to detect intruders.

The sensors may be monitored by a security controller. Upon activation of one of the sensors, the controller may transmit an alarm message to a central monitoring station. The central monitoring station may respond by summoning the police.

At least some of the doors may be provided with an input device that may be used by authorized users of the secured area to provide inputs to the security controller. Inputs may include commands to arm or disarm the security system, to arm or disarm certain doors or simply to allow the user to pass through an associated door without triggering an alarm.

While existing security systems work well, they are difficult to administer where the number of entry points, sensors and types of sensors number in the hundreds and especially where they are used across multiple time zones. Accordingly, a need exists for better methods of administering large security systems.

DETAILED DESCRIPTION OF AN ILLUSTRATED EMBODIMENT

Figure 1:
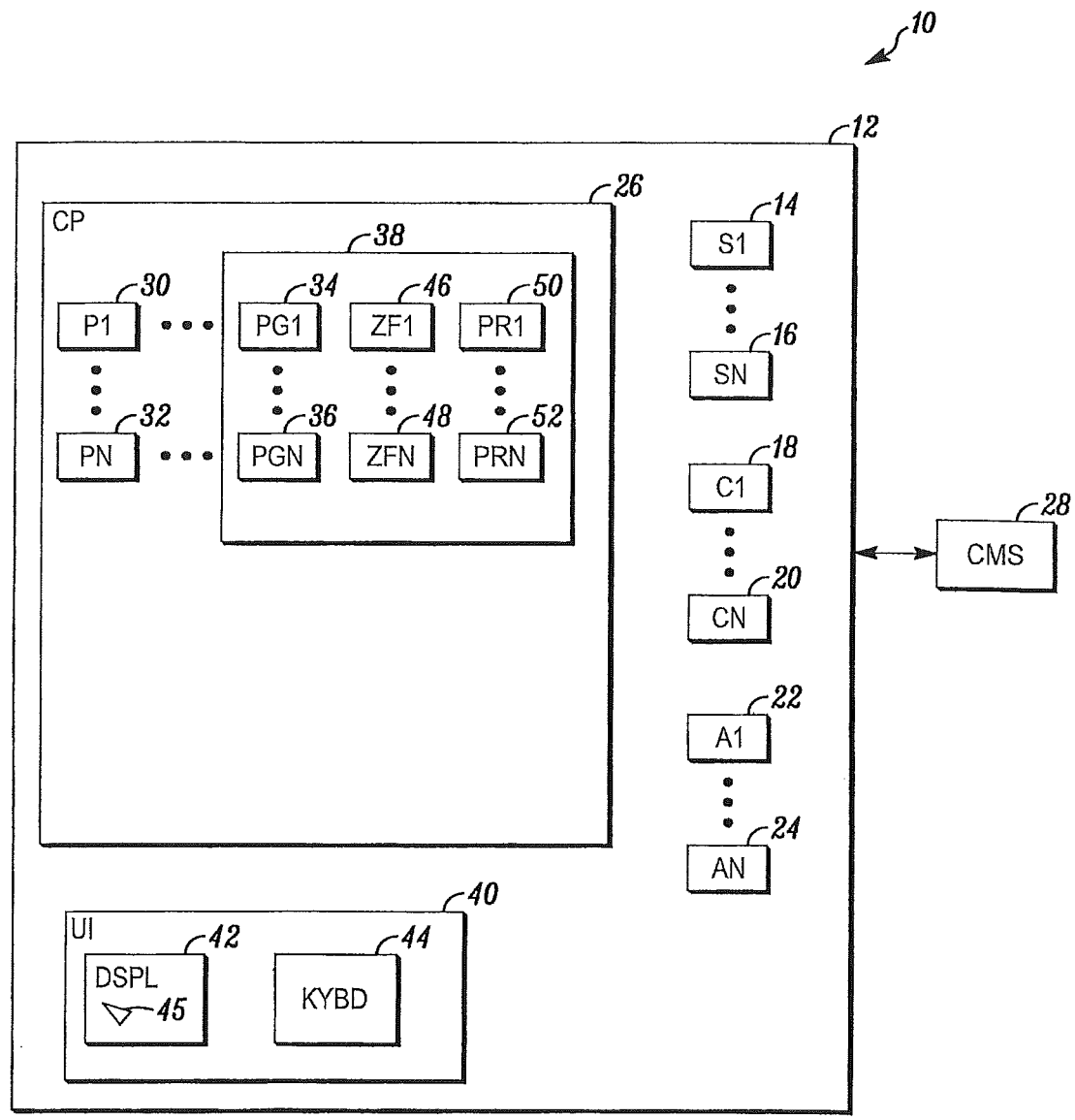
FIG. 1 is a simplified block diagram of a security system shown generally in accordance with an illustrated embodiment.

While embodiments can take many different forms, specific embodiments thereof are shown in the drawings and will be described herein in detail with the understanding that the present disclosure is to be considered as an exemplification of the principles hereof, as well as the best mode of practicing same. No limitation to the specific embodiment illustrated is intended.

FIG. 1 is a simplified block diagram of a security system 10 shown generally in accordance with an illustrated embodiment. Included within the security system is a number of sensors 14, 16 or a number of sensors 14, 16 and cameras 18, 20 used to detect security threats within a secured area 12. The secured area may be located at a single geographic location as shown in FIG. 1 or may be a number of geographically separate areas connected by a communication connection.

The sensors may include one or more switches coupled to the doors and windows around a periphery of the secured area. The sensors may also include one or more passive infrared (PIR) detectors that are able to detect the movement of intruders within an interior of the protected space. Alternatively, the sensors may also include one or more environmental sensors (e.g., smoke detectors, carbon monoxide detectors, natural gas detectors, etc.).

The system may also capture images for security purposes from one or more cameras 18, 20. The cameras may be used to record events from within the secured area or (with the appropriate processing capability) may also be used to detect threats such as posed by intruders within the protected space.

The secured area may also include one or more actuator devices (actuators) 22, 24. The actuators may be selected from any of a number of different types of devices. For example, at least some of the actuators may be audio and/or visual devices (e.g., a siren or siren and flashing light) that announce the detection of a threat within one or more of the secured areas or subareas. Alternatively, the actuators may include one or more linear actuators that open/close doors. At least some of the actuators may also be provided that activate sprinklers that quench fires or that activate or deactivate fans that clear smoke from an area or subarea.

The secured area may also include combinations of sensors and actuators that operate cooperatively to achieve a security objective. For example, at least some of the sensor and actuator combinations may include a card reader used in conjunction with a door lock. In this case, the card reader reads an identification card of a person authorized to use some part of the secured area and activates the lock to allow entry by that person into and out of that part of the secured area.

Included within the secured area or within a central monitoring station 28 may be a control panel 26. The control panel operates to monitor the sensors and cameras and to control the actuators in accordance with a predetermined security plan.

Associated with the control panel is a user interface (UI) 40. The user interface may include an interactive display 42 using a touch-sensitive screen or may be embodied as a conventional display 42 with a separate keyboard 44.

Included within the control panel may be one or more processor apparatus (processors) 30, 32, where each operates under control of one or more computer programs 34, 36 loaded from a non-transitory computer readable medium (memory) 38. As used herein, reference to a step of a computer program is also reference to the processor that executed that step.

In general, the secured area operates under control of a three-dimensional (3D) building information model (BIM) embodied at least as data and data structures within memory. In this context, each sensor, camera and actuator is associated with a respective geographic location within the BIM. More specifically, each sensor, camera and actuator has a set of coordinates associated with the device that defines where the device is located within the BIM model.

The use of the BIM offers a number of advantages in the execution of the security plan. For example, a BIM processor may be used to display three dimensional models of the secured area on the user interface. Since the BIM also includes a respective coordinate of each sensor, camera and actuator, the BIM processor is able to superimpose the location of each of each sensor, camera and actuator on 3D images.

The secured area may be divided into a number of subareas, each with a separate security control subsystem. For example, upon activation of the control panel, one or more of the processors within the control panel would operate to discover each sensor, camera and actuator within the secured area based upon a class of the device. For example, intrusion sensors may constitute or otherwise define a first class of device that would be discovered by an intrusion processor. Similarly, cameras would define a second class of device that would be discovered by a processor that processes information from the camera and that would also operate to control certain aspects (e.g., pan-tilt-zoom (PTZ)) of the camera. The processor that discovers cameras may be referred to as a camera processor/controller or simply as a camera controller. Similarly, card readers and associated lock actuators would define a third class of device discovered by a reader controller. Actuators would define a fourth class of device discovered by an actuator controller.

Each class of device operates under a respective set of parameters. Each of the set of parameters represents an input to that particular class of device that controls the output of the device or the way the output is provided.

In general, each class of device has a first set of parameters that are unique to that device and a second set of parameters that are common with other classes of devices. An example of the second set of parameters includes a value of time (e.g., Greenwich mean time). An example of the first set of parameters that are not common with other classes of devices may include the frames per second set by the camera controller in receiving images from the camera, the PIN numbers of authorized users used by the card reader controller, etc. Because of the differences in operating parameters, each class of device may be considered as functioning under its own localized control system or control panel.

Once activated, the user could define a set of operating parameters for each class of device on an individual basis and globally. For example, the user could define a global clock that would be maintained and used by each control system. The user may also define a set of time related thresholds for at least some classes of device. For example, the user may define a time in the evening when images from the camera would be saved into an archive for later use if a crime were subsequently detected and where the security system sensors did not detect the crime.

Similarly, the user could also define a set of rules for each class of device. Rules in this case represent a broader category of parameters. For example, a rule may define a combination of parameters used by a processor class of device to produce a particular output. For example, a rule may specify that during a first time period, a camera may simply record video and during a second time period, a camera may perform motion detection. In this case, the first set of parameters includes a definition of the first time period (start and stop times) and a triggering parameter that causes the recording of video during the first time period. The second set of parameters includes the definition of the second time period (start and stop time) and a triggering parameter that activates a corresponding program to cause motion detection and reporting of motion as an alarm state.

Each class of device has a set of parameters that defines that class of device. For example, a camera may have a first parameter that defines whether the camera records video frames to memory and a second parameter that defines whether the camera performs motion detection. The camera may also have another parameter that defines when the camera performs each function.

Similarly, a card reader/door lock combination may have a set of parameters that activates and deactivates a corresponding set of rules for that device. In general, an identifier of each class of devices defines how that device operates and the parameters that activate and deactivate the functions of that device. Since the devices in each class have substantially identical functions in terms of the behaviors that may be exhibited by the device, the rules followed and the thresholds for those behaviors and rules, the functions of each device may be defined by a parameter file 50, 52 for that device. It should be noted in this regard that since the devices in any one class have substantially identical functions, the format of the parameter file of each device within a class is also identical. The common format of parameter files among devices of the same class allows the use of a copy paste function that allows the behavior, rules and thresholds of one device in a class to be copied into another device within the same class.

Figures 2A, 2B:
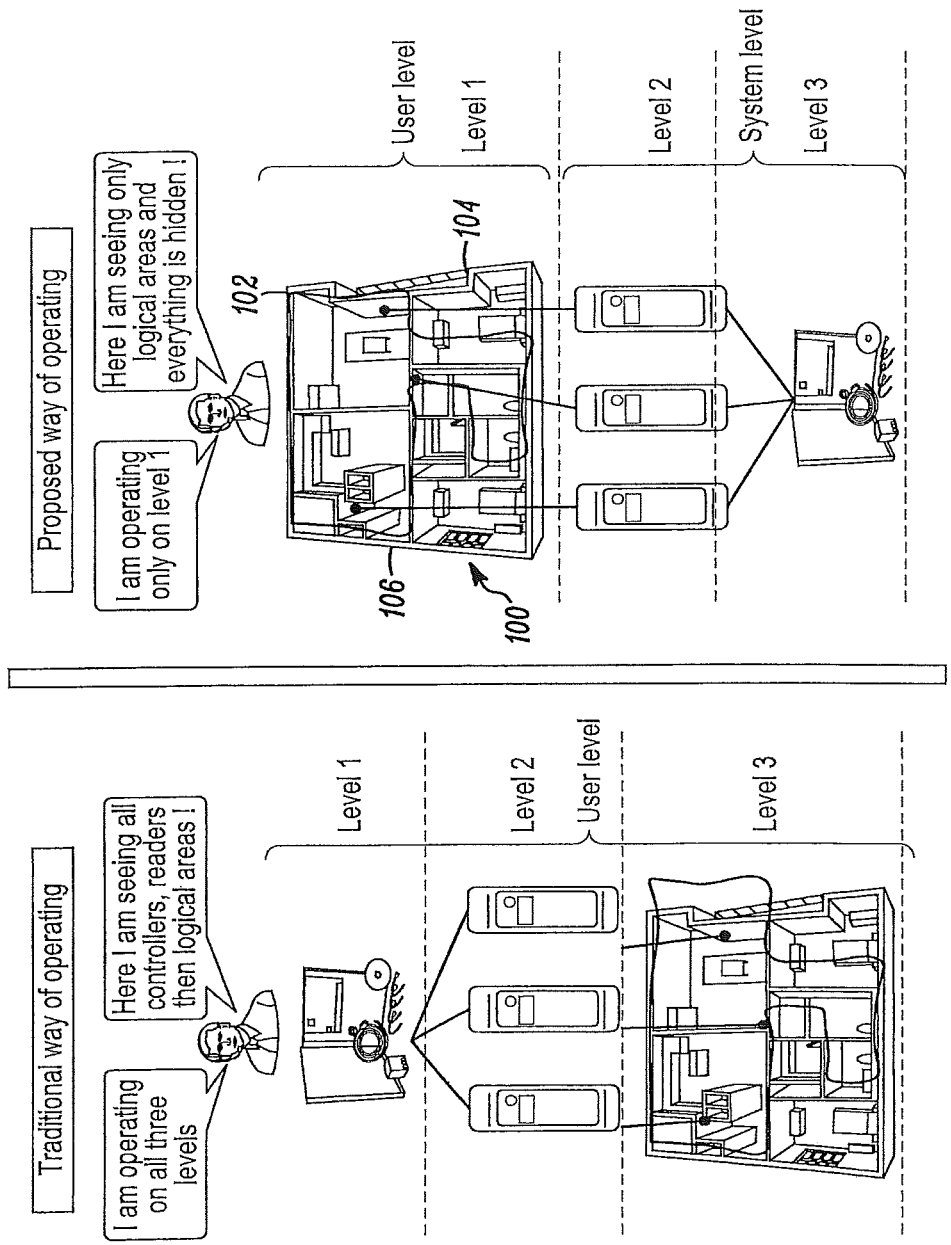
FIG. 2A is a block diagram of a prior art system.
FIG. 2B is a block diagram of a system as in claim 1.

Under the BIM, a user may use the BIM processor to divide the secured area 100 into two or more subareas 102, 104, 106 (see for example, FIG. 2B). Dividing the secured area into subareas also causes the control panel to divide the control systems of the secured area into a respective set of control systems for the subareas.

In order to divide the secured area, the authorized user may activate a BIM icon on the display 42 of the user interface. The user may then identify one or more subareas, regions or security zones within the secured area by tracing the outline of each subarea using the cursor 45. The user may complete the process by activating an ENTER button on the keyboard 42 or activating a COMPLETE softkey on the display to create the virtual regions.

In general, this process is used to define a number of virtual regions under a coordinate system defined by the BIM. This process may be repeated any of a number of times as the user creates the virtual regions using the process of FIG. 2. As each zone is created, it is stored into a respective zone file 46, 48.

The creation of a number of subareas may be used as a method of creating a hierarchy of control systems and operating parameters. The hierarchy allows the system to internally group the devices in each virtual area based upon the class of the device. For example, the highest level (i.e., associated with the entire secured 12) represents a set of global operating parameters. Those subareas that have been divided out can be independently changed by the user. This is important because the highest level can be used to define a global time while the subareas can have a time value that is offset based upon the time zone in which the subarea is located. In this regard, the end user can directly click on a virtual region and can change the time zone. In response, the system will internally apply the modified time zone to all readers and panels in that virtual region. Similarly, security settings and rules can be defined on a global scale and on a local scale.

In one embodiment, the security settings (and parameters) of a parent area may be copied into a created virtual subarea.

Once created, the user can select the subarea (via the cursor) and adjust parameters of the created virtual subarea at will.

For example, each virtual subarea may have a user input including a set of function buttons 300. One function button (e.g., 302) may be provided to adjust global parameters (e.g., time) for that region. Other function buttons (e.g., 304) may be used to select a particular class of device for that region. Other function buttons may be used to select parameters and to change the respective parameters.

Figure 5:
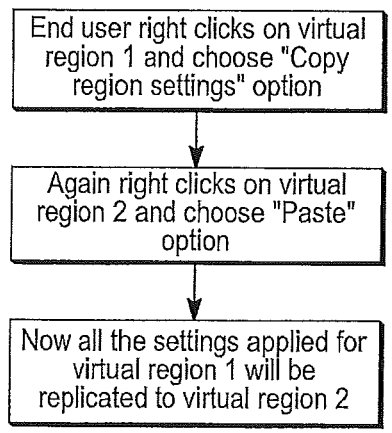
FIG. 5 is an alternate set of steps that may be used by the system of FIG. 1.

For example, the end user may use a first portion of a user input to click on virtual region 1 and a second portion of the user input to choose the "copy region settings" option (FIG. 5). In this regard, a BIM processor may display virtual region 1 along with a set of options related to region 1. One of the options may be the "copy region settings" option. Following this step, the end user may right click on region 2 and choose the "paste" option. In response, a parameter processor of the system copies the regional settings of region 1 into region 2. Now all of the settings that have been previously applied to virtual region 1 will be replicated into region 2.

FIG. 2 compares the system described herein with prior systems. For example, prior systems (FIG. 2A) only allowed a user to access the system on a global level (level 1). If a user should wish to change a parameter, the user would need to access a particular control system associated with a particular class of device (level 2). However, this particular control system included all of the devices of that class throughout the system. Once the user has selected a particular control system (i.e., class of device), the user would be given access to the devices on level 3.

Figure 3:
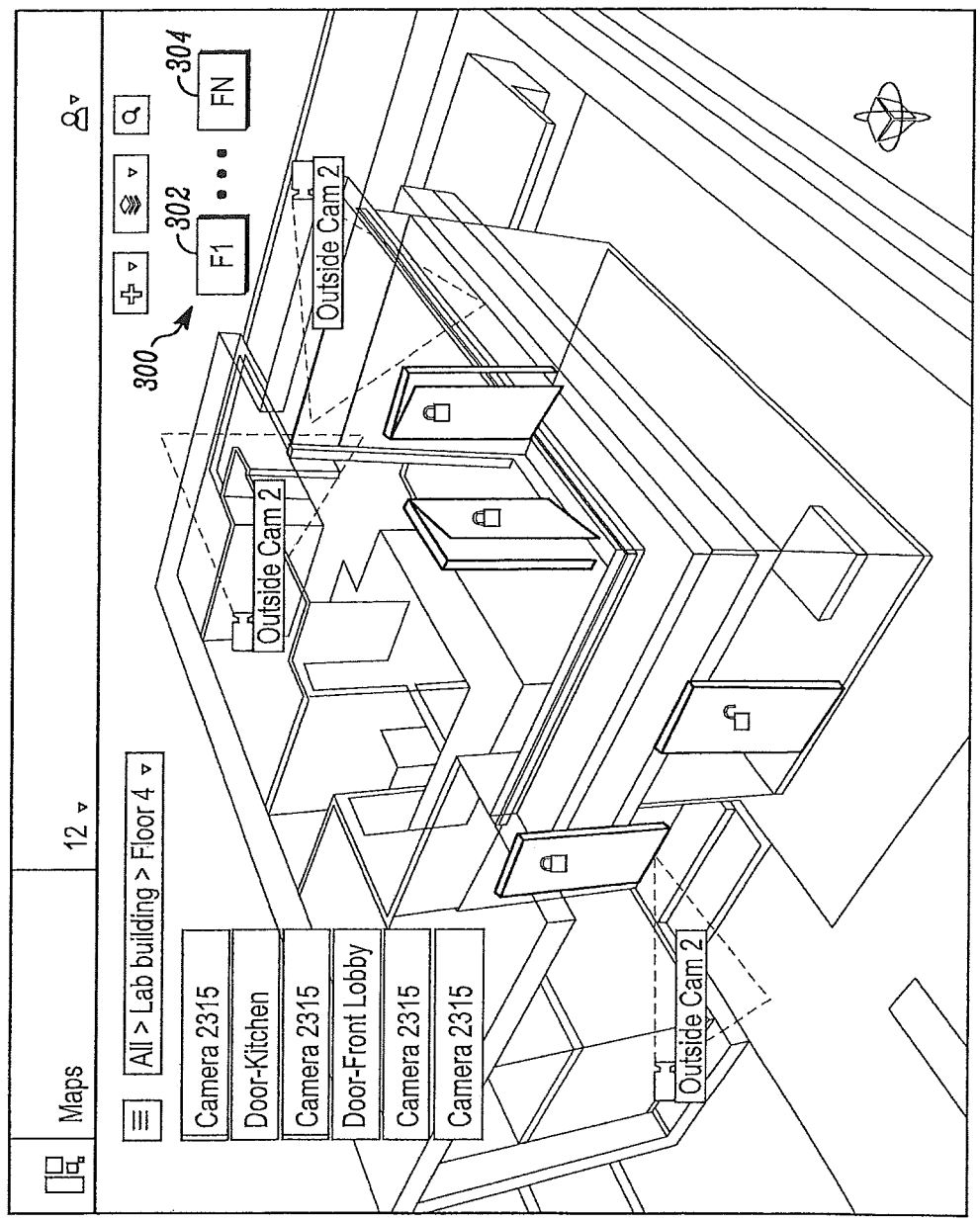
FIG. 3 is a display provided by the system of FIG. 1.
Figure 4:
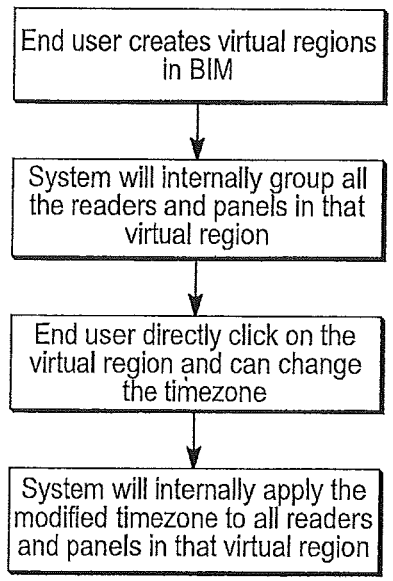
FIG. 4 is a set of steps that may be used by the system of FIG. 1.

In contrast, FIG. 2B shows that once a user selects a particular subarea, the user only has access to the devices within that subarea. In this regard, once a user clicks on a particular region or zone, the system may present a number of classes of devices as shown on level 2 and FIG. 3. One class may be a time keeper class of device. Other classes may include sensors, cameras or card readers. In addition (and as shown in FIG. 3), the selection of a region shows the 3D image of the device under the BIM along with the status of each device within that region. This allows for much simpler administration of the security system.

The prior system of FIG. 2A requires the end user to have complete knowledge of the devices in order to perform any action on the system. This increases the cost of the system by requiring that any user have complete training regarding the system and increases the possibility of mistake.

For example, consider the instance in which an end user wants to change the time zone for a particular area in the secured area. Since the secured area is embodied as a single logical entity, the user would have to change the time zone for each device (e.g., each card reader) within the particular area. This is a repetitive operation that would need to be done on all readers within the particular area.

Similarly, consider the instance in which a door forced open alarm occurred near a building monitoring station (BMS) room and the end user is interested in viewing the recorded video of any camera mounted near the BMS room. In this case, the end user has to know the geo location of each camera within a list of cameras in order to quickly identify the proper camera.

The system of FIGS. 1 and 2B enables the user to make global changes (i.e., to the extent of the devices located within that subarea) by allowing them to virtually mark any area in the BIM 3D floor plan. This allows the user to directly perform all operations (e.g., rules and policy setting, grant/deny access, changing time zone, etc.) only on that subarea. The devices falling within that virtual area will be grouped for that region and all the subsequent parameter change operations on that region will reflect back on all the contained devices to the extent they are a global change for that subarea or in the class of device selected for the change.

In this way, the end user can define the different behaviors, rules, settings, etc. for every virtual region in accordance with the need. This has the effect of completely abstracting the lower level devices and other non-operator centered details in the system and makes inputs to the system more meaningful. The system completely eliminates the need for the operators to know device details of the readers, panels and all other low level device details. This helps the end users to more easily and effectively make changes in the operation of the system.

Whenever changes are made on the virtual regions, like changing a time zone, the system will internally apply all of those changes to the panels/readers in that region. This imparts a logical and physical mapping to the virtual areas that allows a user to visually operate on those regions.

In a particular example, consider a secured area having a number of security areas, each with a different need for security. With the proposed solution, the operator can draw virtual regions containing different regions (e.g., a datacenter and BMS in one region and another region containing a library and pantry). Now the operator can directly set rules and perform other access control operations directly on the different virtual region as separate operations. This method provides complete flexibility over the access control system and allows the end users to easily configure and segregate the different areas in one region.

Consider the example where a fire emergency occurs in a particular area of a premises and where, for precautionary reasons, the operator should take countermeasures. With the display of a conventional security panel there is no apparent way for the operator to visually look at the display and inherently know the identifiers of nearby regions so that he/she can activate the sprinklers in those nearby regions or take some other precautionary measure. Unless the operator has complete knowledge of the floors/premises/building structure he/she cannot act immediately in response to emergency situations.

Consider the example where a secured area has a number of zones with similar security requirements, where different rules and behaviors have been applied among the zones and where at least one of the zones has a rule set that works particularly well. If the operator wants this same set of behaviors, rules and settings to be replicated into another zone or into a newly created zone, then (under illustrated embodiments) the operator is able to directly copy all zone based settings using a simple copy/paste function available through the user interface.

The system offers a number of advantages over prior methods. For instance, the system completely eliminates any need for the operator to know the lower level device detail of each zone and instead provides the operator with a system wherein device detail is abstracted in a way that is flexibly implemented across adjacent zones. The allows an operator to make changes very quickly and efficiently. Since the system internally takes care of correlating layouts among zones, human errors are prevented.

In general, the system operates using the steps of a building information model (BIM) of a security system defining a three-dimensional floor plan of a secured area, the BIM receiving a graphical input from a user defining at least one subarea of the secured area, a user input of the security system receiving a selection of the at least one subarea of the secured area, the user input of the security system receiving a change in a parameter from the user of the security system, the parameter is used by a plurality of security devices within the at least one subarea and changing a corresponding parameter within each of the plurality of security devices to match the changed parameter.

Alternatively, the system includes a security system having a secured area, a building information model (BIM) of the security system that defines a three-dimensional floor plan of the secured area, a zone file that defines a plurality of zones within the secured area in accordance with a coordinate system of the BIM, a user input of the security system that receives a selection of the at least one zone of the plurality of zones within the secured area, the user input of the security system that receives a change in a parameter from the user of the security system, the parameter is used by a plurality of security devices within the selected zone and a processor that changes a corresponding parameter within each of the plurality of security devices to match the changed parameter.

In another embodiment, the system includes a security system having a secured area, a building information model (BIM) of the security system that defines a plurality of regions within the secured area, a first portion of a user input of the security system that receives a selection of the at least one region of the plurality of regions within the secured area, a second portion of the user input of the security system that receives a change in a parameter from the user of the security system, the parameter is used by a plurality of security devices within the selected zone and a parameter processor that changes a corresponding parameter within each of the plurality of security devices to match the changed parameter.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

The invention claimed is:

1. A method comprising:
a user interface device displaying a three-dimensional model of at least part of a floor of a building based on a building information model (BIM) of the building;
the user interface device displaying a representation of each of a plurality of security devices in the at least part of the floor of the building on the three-dimensional model of the at least part of the floor of the building based on respective coordinates of each of the plurality of security devices in the BIM;
the user interface device receiving first user input dividing the three-dimensional model of the at least part of the floor of the building into a plurality of subareas;
based on the respective coordinates of each of the plurality of security devices in the BIM, the user interface device grouping those security devices that are represented on the three-dimensional model of the at least part of the floor of the building to be located within a first one of the plurality of subareas as corresponding to the first one of the plurality of subareas;
the user interface device storing one or more operating parameters for the first one of the plurality of subareas;
the user interface device receiving second user input identifying a change in at least one of the one or more operating parameter for the first one of the plurality of subareas; and
adjust operation of one or more of the security devices associated with the first one of the plurality of subareas to reflect the change in the at least one operating parameter.

2. The method of claim 1 wherein the at least one operation parameter includes a global operating parameter.

3. The method of claim 1 wherein the at least one operation parameter includes an operating parameter that is unique to a first class of security devices.

4. The method of claim 3 further comprising:
the user interface device receiving third user input identifying the first class of device.

5. A method comprising:
a user interface device displaying a three-dimensional model of at least part of a floor of a building based on a building information model (BIM) of the building;
the user interface device displaying a representation of each of a plurality of security devices in of the at least part of the floor of the building on the three-dimensional model of the at least part of the floor of the building based on respective coordinates of each of the plurality of security devices in the BIM;
the user interface device receiving first user input dividing the three-dimensional model of the at least part of the floor of the building into a plurality of subareas;
the user interface device receiving second user input identifying a parent subarea and a child subarea in the plurality of subareas;
copying operating parameters from the parent subarea to the child subarea; and
changing the operating parameters for security devices in the plurality of security devices that are represented on the three-dimensional model of the at least part of the floor of the building within the child subarea to match the operating parameters for security devices in the plurality of security devices that are represented on the three-dimensional model of the at least part of the floor of the building within the parent subarea.

6. The method of claim 5 further comprising:
changing the operating parameters for all of the security devices in the plurality of security devices that are represented on the three-dimensional model of the at least part of the floor of the building within the child subarea when the operating parameters include a global operating parameter.

7. The method of claim 5 further comprising:
changing the operating parameters for security devices of a first class of device in the plurality of security devices that are represented on the three-dimensional model of the at least part of the floor of the building within the child subarea when the operating parameters are unique to the first class of device.

8. The method of claim 7 further comprising:
the user interface device receiving third user input identifying the first class of device.

9. The method of claim 5 further comprising:
the user interface device receiving third user input identifying the operating parameters to be copied from the parent subarea to the child subarea.

10. A system comprising:
a user interface device;
a memory device;
a programmable processor; and
executable control software stored on a non-transitory computer readable medium, wherein the user interface device displaying a three-dimensional model of at least part of a floor of a building based on a building information model (BIM) of the building stored in the memory device, wherein the user interface device displays a representation of each of a plurality of security devices in of the at least part of the floor of the building on the three-dimensional model of the at least part of the floor of the building based on respective coordinates of each of the plurality of security devices in the BIM, wherein the user interface device receives first user input dividing the three-dimensional model of the at least part of the floor of the building into a plurality of subareas, based on the respective coordinates of each of the plurality of security devices in the BIM, the user interface device groups those security devices that are represented on the three-dimensional model of the at least part of the floor of the building to be located within a first one of the plurality of subareas as corresponding to the first one of the plurality of subareas;

the user interface device stores one or more operating parameters for the first one of the plurality of subareas;

wherein the user interface device receives second user input identifying a change in at least one of the one or more operating parameter for the first one of the plurality of subareas, and wherein the programmable processor and the executable control software adjust operation of one or more of the security devices associated with the first one of the plurality of subareas to reflect the change in the at least one operating parameter.

11. The system of claim 10 wherein the at least one operation parameter includes a global operating parameter.

12. The system of claim 10 wherein the at least one operation parameter includes an operating parameter that is unique to a first class of security devices.

13. The system of claim 12 wherein the user interface device receives third user input identifying the first class of device.

14. A system comprising:
a user interface device;
a memory device;
a programmable processor; and
executable control software stored on a non-transitory computer readable medium,
wherein the user interface device displays a three-dimensional model of at least part of a floor of a building based on a building information model (BIM) of the building stored in the memory device,
wherein the user interface device displays a representation of each of a plurality of security devices in of the at least part of the floor of the building on the three-dimensional model of the at least part of the floor of the building based on respective coordinates of each of the plurality of security devices in the BIM,
wherein the user interface device receives first user input dividing the three-dimensional model of the at least part of the floor of the building into a plurality of subareas,
wherein the user interface device receives second user input identifying a parent subarea and a child subarea in the plurality of subareas,
wherein the programmable processor and the executable control software copy operating parameters from the parent subarea to the child subarea, and
wherein the programmable processor and the executable control software change the operating parameters for security devices in the plurality of security devices that are represented on the three-dimensional model of the at least part of the floor of the building within the child subarea to match the operating parameters for security devices in the plurality of security devices that are represented on the three-dimensional model of the at least part of the floor of the building within the parent subarea.

15. The system of claim 14 wherein the programmable processor and the executable control software change the operating parameters for all of the security devices in the plurality of security devices that are represented on the three-dimensional model of the at least part of the floor of the building within the child subarea when the operating parameters include a global operating parameter.

16. The system of claim 14 wherein the programmable processor and the executable control software change the operating parameters for security devices of a first class of device in the plurality of security devices that are represented on the three-dimensional model of the at least part of the floor of the building within the child subarea when the operating parameters are unique to the first class of device.

17. The system of claim 16 wherein the user interface device receives third user input identifying the first class of device.

18. The system of claim 14 wherein the user interface device receives third user input identifying the operating parameters to be copied from the parent subarea to the child subarea.

* * * * *